United States Patent
Sprules

[11] Patent Number: 6,113,662
[45] Date of Patent: *Sep. 5, 2000

[54] PROCESSED SOLID BURNABLE FUEL COMPOSITION

[76] Inventor: Rodney K. Sprules, 88 Greynam Court, Nepean, Ontario, Canada, K2G 5T3

[ * ] Notice: This patent is subject to a terminal disclaimer.

[21] Appl. No.: 09/321,925

[22] Filed: May 28, 1999

Related U.S. Application Data

[63] Continuation-in-part of application No. 09/086,797, May 29, 1998, Pat. No. 5,910,454.

[51] Int. Cl.⁷ .................................. C10L 5/40; C10L 5/48
[52] U.S. Cl. ................................ 44/535; 44/576; 44/577; 44/589; 44/590
[58] Field of Search ............................. 44/535, 576, 577, 44/589, 590

[56] References Cited

U.S. PATENT DOCUMENTS

| | | |
|---|---|---|
| 4,040,796 | 8/1977 | Vincent et al. . |
| 4,042,343 | 8/1977 | Bernard . |
| 4,043,765 | 8/1977 | Tanner . |
| 4,046,517 | 9/1977 | Daizell . |
| 4,104,034 | 8/1978 | Wu et al. . |
| 4,179,269 | 12/1979 | Yates et al. . |
| 4,302,210 | 11/1981 | Duncan . |
| 4,326,854 | 4/1982 | Tanner . |
| 4,333,738 | 6/1982 | Schrader . |
| 5,393,310 | 2/1995 | Wollen . |
| 5,910,454 | 6/1999 | Sprules ..................................... 44/535 |

*Primary Examiner*—Jerry D. Johnson
*Attorney, Agent, or Firm*—Dority & Manning, P.A.

[57] ABSTRACT

A solid burnable fuel composition which contains a major proportion of spent dried coffee grounds is described. The fuel composition includes at least 50% dried spent coffee grounds and a combustible wax which are mixed together and compressed into a suitable shape for combustion. The fuel composition may further include a small amount, 10% or less, of a coking agent useful to control burn rate and to prevent cracking of compressed fuel during combustion. Small amounts of cellulosic material may also be incorporated to improve the structural properties of the composition. Due to its superior heat and flame production, dried spent coffee grounds are an excellent fuel source for processed fuel products such as fire-logs and fuel pellets. The advantage is a hotter, cleaner burn which produces less soot and smoke, releases fewer harmful pollutants and provides a brighter flame over a longer period of time.

24 Claims, No Drawings

PROCESSED SOLID BURNABLE FUEL COMPOSITION

RELATED APPLICATIONS

This application is a continuation-in-part of U.S. patent application Ser. No. 09/086,797 which was filed on May 29, 1998 now U.S. Pat. No. 5,910,454.

FIELD OF THE INVENTION

The present invention relates to solid burnable fuel compositions and, in particular, to a processed solid burnable fuel composition for manufacturing fire-logs, fire starters or fuel pellets which contains a major proportion of dried spent coffee grounds which functions as a carrier and a fuel component.

BACKGROUND OF THE INVENTION

Manufactured fire-logs, fire starters and pellets for fireplaces and stoves are well known and widely used as a convenient heat source, as well as for the aesthetic enjoyment of a natural fire. The higher burn rate, longer burn time, and higher energy density make processed fire-logs an attractive alternative to natural wood. Furthermore, wood has many valuable uses and is accordingly in increasingly shorter supply. The desire to reduce wood consumption to a sustainable rate and to reduce the significant deforestation currently occurring worldwide, adds additional motivation to finding an alternative fuel source. In addition, decreasing landfill capacities have generated motivational incentives for finding alternative uses for waste by-products currently being dumped in landfill sites.

In a study by David A. Tillman, *The Combustion of Solid Fuels and Wastes* published in 1991, the combustion of solid fuels and wastes (including coffee waste) is suggested as potentially economical in raising process energy, generating electricity, and reducing the volume of municipal waste in landfills. The combustion of solid fuel particles—such as biomass, fossil fuels and municipal refuse—in an industrial furnace, boiler or kiln at high rates is investigated. The many advantages of coffee as a fuel source are not apparent from this study. Furthermore, no proposal is made for the production of processed solid fuels or domestically combustible fuels.

Prior art manufactured logs for domestic use have not been entirely satisfactory either in burn characteristics or in costs. The main advantages of processed fire-logs generally include long burn time, easy lighting characteristics, and convenience of use for preparation or maintenance of the fire. As a replacement for natural wood fires, processed logs offer the convenience of not having to stoke the fire to ensure a consistent flame. One log typically burns for 2 to 4 hours, depending on the size of log. However, these advantages are not unqualified. In order to achieve both a substantial flame and a quick ignition time, a significant amount of wax is used. The high combustion rate in combination with a limited air supply available in most modern houses typically results in incomplete combustion, which in turn leads to a buildup of soot and creosote in the flue. Repeated use of such prior art fire-logs can create a fire hazard. In fact, due to the seriousness of this problem, insurance companies recommend that consumers alternate between the use of processed fire-logs and natural wood fires, in addition to frequent cleaning of combustion apparatus.

Not only does the excessive use of wax represent a safety hazard due to the build-up of soot, it also means that the consumer is provided with an aesthetically less pleasing product than natural wood fires. While the substantial use of wax promotes faster ignition, the flame height for the later stages of combustion is significantly lower than when a fire-log is first lit. Consequently, it is difficult for a user to enjoy a flame comparable to a well-maintained natural wood fire.

A further disadvantage of fire-logs high in wax is the pollution produced during combustion. The volatility of wax causes a fast, sooty initial burn that ejects copious amounts of combustion by-products including soot and carbon monoxide into the atmosphere. In addition, some prior art manufactured fire-log compositions contain substances which are toxic or potentially toxic when combusted. There therefore exists a need for a safe, clean burning fire-log that maintains good flame consistency over and extended period of time.

A processed fire-log is disclosed in U.S. Pat. No. 5,393,310 issued to Wollen in 1995, which incorporates a large proportion of waste products, namely grass clippings and leaves. Wollen's primary goal is to use the composition to reduce yard waste in the waste stream while providing a burnable fuel. Leaves and grass clippings alone, however, do not provide a high energy fuel source, and even with the addition of significant amounts of paraffin wax such logs have a low calorific value. Wollen also suggests that the grass clippings be incorporated directly from the lawn without further processing, which introduces a higher moisture content that may interfere with combustion.

In response to pressures on the supply of petroleum waxes, and hence their increasing cost, U.S. Pat. No. 4,326,854 which issued in 1982 to Tanner, discloses a fire-log made of a liquid combustible by-product fuel component combined with a cellulosic or ligno-cellulosic particulate that serves as a carrier for the fuel component. The carrier provides a combustible skeleton of solid material such as sawdust or other cellulosic particulate incorporated at between 25% and 70% by weight, and preferably about 35%–40% by weight, with a binder fuel component comprising a liquid combustible by-product that is solidified by either polymerization or neutralization by the addition of various chemicals. The preferred liquid by-product fuel component is molasses. As one of many examples, Tanner tested a composition containing 60 parts (by weight) liquid vegetable pitch fuel component, 6 parts oleic acid, 3 parts caustic soda, and 37 parts coffee grounds as a carrier for the fuel component. Any advantage from using spent dried coffee grounds as a fuel source, such as cleaner burn and higher energy yield, were not recognized by Tanner.

OBJECTS OF THE INVENTION

It is an object of the invention to provide a cleaner burning processed fire-log, fire starter or fuel pellet.

It is a further object of the invention to provide a processed fire-log having excellent flame characteristics.

It is yet a further object of the invention to provide a processed fire-log, fire starter or fuel pellet containing a major portion of dried spent coffee grounds.

It is yet a further object of the invention to provide a processed fire-log, fire starter or fuel pellet which produces less soot and smoke than prior art processed fire-logs when properly combusted.

SUMMARY OF THE INVENTION

In accordance with a first aspect of the invention, there is provided a processed solid burnable fuel composition for use in the manufacture of fire-logs and fuel pellets, consisting essentially of:

at least 50% by weight of dried spent coffee grounds; and the balance a combustible binder.

In accordance with a further aspect of the invention, there is provided a processed solid burnable fuel composition for use in the manufacture of fire-logs and fuel pellets, consisting essentially of:

at least 50% by weight of dried spent coffee grounds;
at most 35% by weight of a combustible wax; and
the balance selected from at least one of a combustible cellulosic material and a coking agent, the coking agent being 10% or less by weight of the total composition.

The invention also provides a processed solid burnable fuel composition for use in the manufacture of fire-logs and fuel pellets, consisting essentially of:

at least 50% by weight of dried spent coffee grounds;
at most 40% by weight of a combustible wax; and
the balance a coking agent in an amount that is 10% by weight or less of the total composition.

The solid burnable fuel compositions in accordance with the invention have as a principal component dried spent coffee grounds. The dried spent coffee grounds serve the principal function as a fuel source rather than as a carrier for a fuel component. Experimentation has shown that not only is coffee a superior fuel source, it is clean burning and produces more and brighter flame per BTU than traditional wood sawdust/wax logs. Experimentation has also shown that fire-logs made from the solid fuel composition are cleaner burning because less wax is required for the same energy output and flame duration. Furthermore, coffee is cleaner burning than wood sawdust. The lower wax content implies that soot and smoke are reduced during combustion. Moreover, due to the absence of lignin and the high volatile to fixed carbon ratio, coffee is less aromatic than wood. Consequently, there is less likelihood of producing polycyclic aromatic hydrocarbons (PAHs) during combustion.

In order to control and extend the burn time of fire-logs made from the solid burnable fuel composition in accordance with the invention, small amounts of a coking agent may b e added to the composition. Coking agents determined to be effective include starches, molasses, sugars and black liquor. Coking agents form a carbon crust over a burning fire-log to control burn and inhibit cracking during combustion. Cracking of a log during combustion can be further controlled by the addition of cellulosic materials, in particular fibrous cellulosic materials such as paper and vegetable fibers, straws, fibers from cotton, flax or hemp, dried leaves, sawdust and peat.

In general, the solid burnable fuel composition in accordance with the invention may be used to produce a fire-log with less wax than prior art sawdust logs, thus controlling costs while providing a cleaner burning, more aesthetic product.

DETAILED DESCRIPTION OF THE PREFERRED EMBODIMENTS

Coffee, in the form of spent grounds is a very attractive fuel source for manufactured fire-logs and fuel pellets. Coffee contains approximately 25% higher energy potential than dry hardwood. Used coffee also has a highly uniform particle size. Currently, no further use is available for spent coffee. Thus the use of coffee as a fuel source is energy efficient, inexpensive and diverts waste from landfill. By capitalizing on the desirable fuel characteristics of coffee grounds, a premium solid fuel can be produced in accordance with the solid fuel compositions of the present invention.

As indicated in Table 1, coffee has an energy content in excess of 10,000 BTU/lb. Processed solid burnable fuels are typically produced from a fibrous particulate, usually combined with a combustible binder such as wax and compressed under heat and pressure. The most common fibrous particulates are wood and bark shavings that have heat values ranging from 8000 to 9500 BTU/lb respectively (bark is typically higher). Thus, if coffee grounds are used as the principal constituent of the fuel, less combustible binder is required to achieve an equivalent calorific value.

TABLE 1

| Characteristics of Spent (Post-brewed) Coffee Grounds | | | |
| --- | --- | --- | --- |
| Analytical Data/ Test Method | Units | As Analyzed | Dry @ 105° C. |
| Heat of Combustion, ISO-1928 | BTU/lb | 10 005 | 10 218 |
| Moisture, ASTM D-3173 | Wt % | 2.09 | — |
| Ash, ASTM D-3174 | Wt % | 0.82 | 0.84 |

In addition to having a higher calorific value, coffee grounds have a higher volatile/fixed carbon ratio than that of wood-based particulates. Consequently, coffee has a superior flame performance. This is an excellent characteristic for processed fire-log applications as it permits the production of a smaller fire-log with equivalent calorific values and a longer flame duration.

Experimentation has shown that processed solid burnable fuel composition made from at least 50% spent coffee grounds provides a cleaner burning, more economical fire-log than any other known processed fuel composition.

This fuel composition offers several advantages over prior art. The major portion of the calorific value and the volatile/ fixed carbon ratio is derived from the binder in prior art fuel compositions. The solid particulate (usually sawdust) is used principally to provide supporting structure (carrier) for the binder. Since dried spent coffee grounds contribute greater calorific value and volatile/fixed carbon ratio, the binder requirement is reduced. The fuel composition in accordance with the invention is less expensive to manufacture, less polluting, safer to burn and more aesthetically pleasing due to better flame properties than existing processed fire-logs.

Superior flame characteristics and length of burn under flame are substantiated by the following test data which serves to demonstrate these unexpected advantages provided by the present processed fuel composition.

EXAMPLE 1

Sixteen samples of solid fuel were prepared for testing. Each sample contained 25% wax and the remainder was coffee and/or sawdust. The percentage by total weight of coffee was increased from 0% to 75%, in 5 percent increments. The samples were burned, and the flame height was measured until the flame extinguished. The flame height was integrated with respect to time in order to quantify flame output in inch-seconds. As demonstrated in Table 2, the flame output per BTU increases as the proportion of coffee increases. The coffee-wax sample exhibited 82% more flame per BTU than the wood sawdust-wax sample.

TABLE 2

Flame Output, per BTU, of Samples Containing Wax and Various Combinations of Coffee and Wood Sawdust

| Wax Percent of Sample by Weight | Coffee | Sawdust | Coffee/Wood | In-sec/BTU |
|---|---|---|---|---|
| 0.25 | 0.00 | 0.75 | 0.00 | 62.78 |
| 0.25 | 0.05 | 0.70 | 0.07 | 72.34 |
| 0.25 | 0.10 | 0.65 | 0.15 | 71.92 |
| 0.25 | 0.15 | 0.60 | 0.25 | 79.95 |
| 0.25 | 0.20 | 0.55 | 0.36 | 81.84 |
| 0.25 | 0.25 | 0.50 | 0.50 | 90.88 |
| 0.25 | 0.30 | 0.45 | 0.67 | 86.06 |
| 0.25 | 0.35 | 0.40 | 0.88 | 100.34 |
| 0.25 | 0.40 | 0.35 | 1.14 | 87.00 |
| 0.25 | 0.45 | 0.30 | 1.50 | 91.88 |
| 0.25 | 0.50 | 0.25 | 2.00 | 102.69 |
| 0.25 | 0.55 | 0.20 | 2.75 | 84.30 |
| 0.25 | 0.60 | 0.15 | 4.00 | 117.43 |
| 0.25 | 0.65 | 0.10 | 6.50 | 121.43 |
| 0.25 | 0.70 | 0.05 | 14.00 | 125.52 |
| 0.25 | 0.75 | 0.00 | — | 114.58 |

The combination of higher BTU output and the higher flame output per BTU provides a product with significant quality and cost advantages. In addition, a low wax content in coffee-based logs reduces the likelihood of dripping during combustion, improving overall performance. In order to further illustrate the advantages of dried spent coffee grounds as a primary fuel source, Example 2 provides a comparison of flame output for wood sawdust fire-logs and coffee-based fire-logs with decreasing wax content.

EXAMPLE 2

Various wood sawdust-wax samples and coffee-wax samples were prepared with increasing solid particulate/wax ratios. The samples were burned, and the flame height was measured until it extinguished. The flame height was integrated with respect to time in order to quantify flame output in inch-seconds. The results, shown in Table 3, demonstrate that for each solid-particulate-wax combination, the coffee sample consistently produced a significantly higher flame output.

TABLE 3

Flame Output by Solid Particulate Content

| Wax | Coffee Samples | | Sawdust Samples | |
|---|---|---|---|---|
| % by Weight | % by Weight | Inch-seconds | % by Weight | Inch-seconds |
| 0.00 | 1.00 | 2063.00 | 1.00 | 901.50 |
| 0.05 | 0.95 | 2275.50 | 0.95 | 980.00 |
| 0.10 | 0.90 | 2452.50 | 0.90 | 990.00 |
| 0.15 | 0.85 | 2223.00 | 0.85 | 793.75 |
| 0.20 | 0.80 | 2360.00 | 0.80 | 1038.25 |
| 0.25 | 0.75 | 2736.25 | 0.75 | 1570.75 |
| 0.30 | 0.70 | 2704.00 | 0.70 | 1623.75 |
| 0.35 | 0.65 | 3051.00 | 0.65 | 1822.75 |
| 0.40 | 0.60 | 3065.00 | 0.60 | 2084.00 |
| 0.45 | 0.55 | 3084.75 | 0.55 | 2172.75 |
| 0.50 | 0.50 | 3187.50 | 0.50 | 2388.00 |

It can be seen from Table 3, for example, that a log containing 90% coffee and 10% wax provides slightly more flame output than a log containing 50% wood sawdust and 50% wax. Since wax is the main contributor to the cost of a processed fuel composition, the fuel compositions in accordance with the invention are less expensive to manufacture.

The implications for product cost measured for energy content or flame performance are significant. Input costs and heating values for wax, coffee and wood sawdust are presented in Table 4.

TABLE 4

Current Cost (Canadian dollars) and Energy Value of Wax, Coffee and Wood Sawdust

| Item | Value [$/lb] | Heating Value [Btu/lb] |
|---|---|---|
| Wax | 0.23 | 18,000 |
| Wood Sawdust | 0.08 | 8,000 |
| Coffee Grounds | 0.08 | 10,000 |

Table 5 shows the cost of materials for several coffee-based fire-logs and wood-based fire-logs with equivalent energy content. The differences in cost are significant, particularly when coffee comprises at least half the total weight of the fire-log.

TABLE 5

Comparison of Coffee-based and Wood-based Logs with Equivalent Energy Values

| Coffee-Based Log | | | Wood-Based Log with Equivalent Energy Value (BTU/lb) | | | Percentage |
|---|---|---|---|---|---|---|
| Coffee [%] | Wax [%] | Cost [$/5 lb] | Sawdust [%] | Wax [%] | Cost [$/5 lb] | Difference in Cost |
| 25 | 75 | 0.96 | 20 | 80 | 1.00 | 4% |
| 30 | 70 | 0.93 | 24 | 76 | 0.97 | 5% |
| 35 | 65 | 0.89 | 28 | 72 | 0.94 | 6% |
| 40 | 60 | 0.85 | 32 | 68 | 0.91 | 7% |
| 45 | 55 | 0.81 | 36 | 64 | 0.88 | 8% |
| 50 | 50 | 0.78 | 40 | 60 | 0.85 | 10% |
| 55 | 45 | 0.74 | 44 | 56 | 0.82 | 11% |
| 60 | 40 | 0.70 | 48 | 52 | 0.79 | 13% |
| 65 | 35 | 0.66 | 52 | 48 | 0.76 | 15% |
| 70 | 30 | 0.63 | 56 | 44 | 0.73 | 17% |
| 75 | 25 | 0.59 | 60 | 40 | 0.70 | 19% |
| 80 | 20 | 0.55 | 64 | 36 | 0.67 | 22% |
| 85 | 15 | 0.51 | 68 | 32 | 0.64 | 25% |
| 90 | 10 | 0.48 | 72 | 28 | 0.61 | 28% |
| 95 | 5 | 0.44 | 76 | 24 | 0.58 | 33% |
| 100 | 0 | 0.40 | 80 | 20 | 0.55 | 38% |

The data from Table 3, and the raw material values from Table 4, can be used to estimate the cost of producing wood sawdust fire-logs that have equivalent flame output to coffee-based fire-logs. Table 6 shows the cost of coffee-based fire-logs in increments of 5% in the coffee content compared with the cost of wood/wax fire-logs with equivalent flame output. The cost savings associated with using coffee as the main constituent (50%+) are quite substantial.

TABLE 6

Comparison of Coffee-based and Wood-based Logs with Equivalent Flame Output

| Coffee-Based Log | | | Wood-Based Log With Equivalent Flame Output (inch-seconds) | | | Percentage |
|---|---|---|---|---|---|---|
| Coffee [%] | Wax [%] | Cost [$/5 lb] | Sawdust [%] | Wax [%] | Cost [$/5 lb] | Difference in Cost |
| 25 | 75 | 0.96 | 17 | 83 | 1.02 | 6% |
| 30 | 70 | 0.93 | 20 | 80 | 1.00 | 8% |
| 35 | 65 | 0.89 | 23 | 77 | 0.98 | 10% |
| 40 | 60 | 0.85 | 26 | 74 | 0.96 | 12% |
| 45 | 55 | 0.81 | 29 | 71 | 0.93 | 15% |
| 50 | 50 | 0.78 | 32 | 68 | 0.91 | 18% |
| 55 | 45 | 0.74 | 35 | 65 | 0.89 | 21% |
| 60 | 40 | 0.70 | 38 | 62 | 0.87 | 24% |
| 65 | 35 | 0.66 | 41 | 59 | 0.85 | 28% |
| 70 | 30 | 0.63 | 43 | 57 | 0.82 | 32% |
| 75 | 25 | 0.59 | 46 | 54 | 0.80 | 36% |
| 80 | 20 | 0.55 | 49 | 51 | 0.78 | 42% |
| 85 | 15 | 0.51 | 52 | 48 | 0.76 | 48% |
| 90 | 10 | 0.48 | 55 | 45 | 0.74 | 55% |
| 95 | 5 | 0.44 | 58 | 42 | 0.71 | 63% |
| 100 | 0 | 0.40 | 61 | 39 | 0.69 | 73% |

Several production efficiencies are also attainable in the manufacture of fuel compositions in accordance with the invention. Since coffee can be obtained in a relatively homogenous mixture from food processing establishments, it is less likely to contain impurities such as found in sawdust (e.g. dirt rocks, and metals from bark, furniture finishing processes, sawmills). Consequently, less energy and capital are required to clean the material input stream.

The inherent properties of spent coffee grounds also confer several production efficiencies. Because coffee contains natural oils, it is less abrasive and thus reduces wear on machinery. Additionally, the roasting process leaves a substantially dry coffee ground residue, thus coffee grounds require less energy for drying than wood sawdust.

The bulk handling characteristics are also simplified because of the narrow particle size distribution (PSD) commonly found in dried spent coffee grounds. Irregularities in particle sizes in processed solid fuels may cause cracking during combustion, resulting in an undesirably vigorous and potentially hazardous burn rate. Dried spent coffee grounds have a highly uniform PSD, in contrast to wood products which generally contain more irregular particle sizes. Coffee-based fuel compositions therefore have a more homogeneous structure, which ensures better shape retention and resistance to cracking or breakage during handling and combustion.

Production efficiencies are also gained because coffee-based fuel compositions require less compression pressure to achieve a cohesive structure when they are formed into fire-logs or fuel pellets. Hence, savings are realized from the reduction in power consumption during extrusion or molding. Table 7 shows the pressure required (in pounds per square inch) to form a cohesive fire-log using coffee/wax and flame output equivalent to wood sawdust/wax fuel mixtures.

TABLE 7

Forming Pressure for Coffee and Sawdust Samples of Equivalent Flame Output

| | Coffee Samples | | Sawdust Samples | |
|---|---|---|---|---|
| Wax % by Weight | % by Weight | Forming Pressure (psi) | % by Weight | Forming Pressure (psi) |
| 0.10 | 0.90 | 1296 | 0.90 | n.a. |
| 0.15 | 0.85 | 963 | 0.85 | n.a. |
| 0.20 | 0.80 | 630 | 0.80 | 1222 |
| 0.25 | 0.75 | 556 | 0.75 | 815 |
| 0.30 | 0.70 | 296 | 0.70 | 667 |
| 0.35 | 0.65 | 148 | 0.65 | 519 |
| 0.40 | 0.60 | 74 | 0.60 | 481 |
| 0.45 | 0.55 | n.a. | 0.55 | 370 |
| 0.50 | 0.50 | n.a. | 0.50 | 259 |
| 0.55 | | n.a. | 0.45 | 74 |
| 0.60 | | n.a. | 0.40 | 56 |
| 0.65 | | n.a. | 0.35 | 37 |

Lower production costs are also achieved because of the compact shape of coffee grounds. Although the elongated shape of wood fibers is ideal for use in pulp/paper products, it is a less desirable property during the processing of processed wood-based fuel. In order to reduce expansion in a wood/wax based fire-log subsequent to forming, more pressure, heat and cooling time are required. For example, a sample of 80% wood and 20% paraffin wax was compressed to a density of 950 kg/M$^3$. Following a cooling period of 5 minutes, the pressure was released and the sample was removed from the mold. Before stabilizing, the sample expanded to a density of 432 kg/m$^3$ which represents an expansion of 220%. A log made from 80% coffee and 20% wax which was molded under the same conditions stabilized at a density of 861 kg/m$^3$ which represents an expansion ratio of only 110%. In order to attain an equivalent expansion ratio, a wood based fire-log must contain 70–75% wax. Alternately, to reduce the expansion ratio of a wood/wax fire-log containing 80% wood and 20% wax, either more heat or higher pressure in combination with a longer cooling time must be used. Thus, the inherent mechanical properties of dried spent coffee grounds greatly reduce the processing costs associated with the production of molded solid fuels.

The solid burnable fuel composition also provides several environmental and safety-related advantages. Due to the absence of lignin, and the high volatile to fixed carbon ratio, coffee is less aromatic than wood. Consequently, there is less chance that polycyclic aromatic hydrocarbons (PAHs) are produced during combustion.

The high wax content that is required for long-lasting wood-based fire-logs results in substantially more smoke and soot. This contributes to atmospheric pollution and presents a safety hazard because of flammable deposits left in chimneys.

EXAMPLE 3

Various wood sawdust/wax samples and coffee/wax samples were prepared with increasing concentrations of solid fuel. Two tests were performed with each sample. First, two minutes after ignition, a glass plate was held one inch above the flame for 15 seconds. The diameter of the soot pattern was then recorded. Second, after 2.5 minutes, a glass beaker was held one inch above the flame for ten seconds. The quantity and clarity of the smoke was rated on a scale of zero to five, where 0 corresponded to substantially no smoke (combustion moisture only) and 5 corresponded to black, dense smoke. The results shown in Table 8 demonstrate that for each sample tested, the coffee/wax sample consistently produced significantly less smoke and soot than a sawdust/wax sample having an equivalent flame output.

than micro-crystalline wax but the difference in net cost per fire-log is negligible since less wax is required for fire-logs made in accordance with the present invention. The preferred property ranges for waxed-based binders are listed in Table 9.

TABLE 8

Comparison of Soot and Smoke, for Samples of Equivalent Flame Output (in Inch-seconds)

| Coffee-based Sample | | | Sawdust-based Sample | | | Difference in Sawdust Sample Compared to Coffee | |
|---|---|---|---|---|---|---|---|
| Coffee | Wax | Smoke | Sawdust | Wax | Smoke | | |
| as a % of total weight | Soot Diameter inches | Value (scale 0–5) | as a % of total weight | Soot Diameter inches | Value (scale 0–5) | Soot Diameter percent | Smoke Value percent |
| 0.60 | 0.40 | 3.5 | 3.0 | 0.38 | 0.62 | 5.5 | 4.7 | 57% | 57% |
| 0.65 | 0.35 | 3.0 | 1.5 | 0.41 | 0.59 | 5.2 | 4.4 | 73% | 193% |
| 0.70 | 0.30 | 0.0 | 0.5 | 0.43 | 0.57 | 4.6 | 4.2 | n.a. | 740% |
| 0.75 | 0.25 | 0.0 | 0.5 | 0.46 | 0.54 | 3.9 | 3.8 | n.a. | 660% |
| 0.80 | 0.20 | 0.0 | 0.5 | 0.49 | 0.51 | 3.6 | 3.2 | n.a. | 540% |
| 0.85 | 0.15 | 0.0 | 0.5 | 0.52 | 0.48 | 3.3 | 2.8 | n.a. | 460% |
| 0.90 | 0.10 | 0.0 | 0.0 | 0.55 | 0.45 | 3.0 | 2.5 | n.a. | n.a. |

The test results shown in Table 8 illustrate that wood/wax samples produce between 0.5 and 8 times as much soot and smoke as coffee/wax samples providing equivalent flame output. The environmental advantages of solid fuel compositions in accordance with the invention are therefore clearly demonstrated.

Having demonstrated the efficacy of dried spent coffee grounds as a primary fuel source in solid fuel compositions, various preferred compositions will now be described.

In one embodiment of th e invention, the solid burnable fuel includes at least 50% spent coffee grounds, preferably having a moisture content of less than 20%, and a combustible binder. The procedure for production of a solid fuel involves the initial drying of the spent coffee grounds, if required, to an optimum moisture content. The binders/additives are then mixed with the dried spent coffee grounds, and the resultant mixture is formed into a desired shape under pressure. This solid fuel mixture is preferably compressed to a density of between 650 and 1250 kg/m$^3$. Characteristics such as oxidation rate and flame duration can be controlled by variations in surface area and density, and through an addition of less volatile substances, as is well understood in the art.

Many different binders may be used, the choice being governed by criteria as simple as combustibility. Petroleum and sugar-based binders have been used in processed solid fuels since the turn of the century because of their desirable characteristics, such as high calorific value. In order to enhance the environmental benefits of burning coffee grounds, an environmentally sound binder should be used. Wax binders are the most desirable, as they have high energy content, are solid at room temperature, and have less complex products of combustion than most combustible by-products.

Several types of waxes can be used including insect, animal, vegetable, and mineral. However, the cost varies considerably depending on the source, and thus paraffin and micro-crystalline waxes are typically the most cost effective. Paraffin is preferred as it typically has less oil content, and thus has a cleaner burn. Paraffin is generally more expensive

TABLE 9

Acceptable Ranges of Wax Binders

| Property | Test Method | Units | Min | Max |
|---|---|---|---|---|
| Melting Point | ASTM D-127 | ° C. | 45 | 71 |
| Kinematic Viscosity | ASTM D-445 | CSt @ 100° C. | 2.5 | 19 |
| Oil Content | ASTM D-721 | % weight | 0 | 23 |

In a further embodiment of the invention, a burnable fuel log comprises a homogeneous mixture including: at least 50% dried coffee grounds, between 0 and 25% cellulosic material, and 35% or less wax as a binder. The extruded log has a density of between 800 and 1,100 kg/m$^3$. The density and surface area may be used to control oxidation rate, and to prevent cracking upon combustion as described above. When practical density limits are reached, other solid by-products that are less volatile can then be added for further combustion control. This composition produces a solid burnable fuel that creates negligible smoke and soot upon combustion.

The cellulosic material may be any material that serves to either wick molten wax from the centre of the log, or to increase structural integrity of the fire-log throughout combustion. The most desirable cellulosic materials are those which have a long stringy structure, and a high calorific value. The potential cellulosic materials are numerous, including vegetable fibers, straws, fibers from cotton, flax, hemp, sisal or natural fabric rags, wood fibers, dried leaves, peat, shredded paper, etc.

Table 10 provides test results obtained from the combustion of several samples of this composition. In all cases, the coffee was first dried to a moisture content of approximately 15% and the mixture was compressed to a density of 950 kg/m$^3$. The binder was melted, mixed together with the coffee and cellulosic material, and formed into a log. The samples were formed with a press, but any number of forming processes are acceptable depending on desired production rate (e.g. extrusion). The formed fire-log contained grooves along the sides to maximize the surface area to improve burn time.

TABLE 10

Examples of Preferred Embodiment #2

| Solid Fuel Mixture, Percent by Weight | | | Performance | |
|---|---|---|---|---|
| Coffee | Fibrous Material | Wax | Inch-seconds | Remarks |
| 69% | 1% - leaves | 30% | 3443 | produces very little soot or smoke upon combustion leaves reduce cracking during combustion |
| 50% | 20% - sawdust | 30% | 3121 | sawdust assisted in maintaining fuel structure throughout combustion lower calorific value of wood reduced flame output. |
| 60% | 10% - peat moss | 30% | 3364 | high calorific value of peat moss produced high energy peat moss reduced cracking upon combustion |
| 69.5% | 0.5% - cotton fibers | 30% | 3520 | prevented cracking more than other fibrous materials tested effectively wicked wax to surface of log |

Additional materials may be added in minor amounts (preferably 1% or less), such as an odor enhancer or a flame colorant, such as metal salts, which are well known in the art. Acceptable odor enhancers are natural oils, such as citrus oil, pine oil, etc.

In a further embodiment of the invention, a burnable fire-log comprises a mixture including: at least 50% dried spent coffee grounds, up to 10% of a coking agent, and up to 40% low flash point binder such as wax. The extruded log preferably has a density of between 800 and 1000 kg/M³. The density and surface area are varied to control oxidation rate, and to prevent cracking upon combustion. This composition produces a solid burnable fuel that creates very high flame output, equivalent to the highest quality prior art fire-log, but with less smoke and soot upon combustion.

The higher wax content serves only to increase the flame duration. The composition provides a fire-log that is equivalent to that of a wood-based log with a 60% wax content. Consequently, as shown in Example 3 and Table 8, a wax content of 35% surpasses that which is required for efficient combustion. However, with the addition of a coking agent, the combustion rate can be controlled at an optimum level.

The coking agent may be any material that serves to both reduce the combustion rate of a high-wax fire-log in order to maintain a safe and efficient burn, and to form a carbonic surface structure on combustion to inhibit molten wax from dripping from the fire-log. The most desirable coking agents are those which meet these criteria, and have a relatively high calorific value. Acceptable coking materials are starches such as corn, wheat, potato or any other vegetable starch; molasses such as cane, beet or sorghum; sugar in raw, crude or waste form; black liquor, etc.

Table 11 shows results of several compositions tested. In all cases, the coffee was first dried to a moisture content of approximately 15% and the mixture was compressed to a density of 950 kg/m³. The formed log contained grooves along the sides to maximize the surface area and improve burn time. The liquid coking agents were not solidified or chemically treated before or after they were incorporated into the fuel composition.

TABLE 11

Examples of Preferred Embodiment #3

| Solid Fuel mixture, Percent by Weight | | | Performance | |
|---|---|---|---|---|
| Coffee | Cooking Agent | Wax | Inch-seconds | Remarks |
| 55% | 10% - starch (corn) | 35% | 3956 | high calorific value of starch added to flame output starch effectively reduced combustion rate and bonded log together |
| 55% | 10% - molasses (cane) | 35% | 3857 | molasses effectively reduced combustion rate and bonded log together |
| 55% | 10% - sugar (raw, cane) | 35% | 3407 | moderate calorific value provides a highly consistent flame sugar effectively reduced combustion rate and bonded log together |

As described above, additional materials may be added in minor amounts to provide scent (odor enhancer) and vary flame color (flame colorant), such as a metal salt.

The invention thereby provides premium solid fuel compositions useful in the manufacture of fire-logs and fuel pellets which offer superior flame and heat output while producing less soot and smoke than comparable prior art compositions.

Changes and modifications of the preferred embodiments described above will no doubt become apparent to persons skilled in the art. The scope of the invention is therefore intended to be limited solely by the scope of the appended claims.

I claim:

1. A clean burning processed solid fuel composition providing an improved flame output for use in the manufacture of fire-logs, fire starters and fuel pellets, consisting essentially of:
   at least 50% by weight of dried spent coffee grounds;
   at most 40% by weight of a normally solid combustible binder; and
   the balance selected from at least one of a coking agent and a cellulosic material, the coking agent being at most 10% or less by weight of the total composition.

2. A clean burning processed solid fuel composition as claimed in claim 1 wherein the combustible binder is a wax.

3. A clean burning processed solid fuel composition as claimed in claim 2 wherein the wax is a petroleum wax.

4. A clean burning processed solid fuel composition as claimed in claim 3 wherein the petroleum wax is paraffin.

5. A clean burning processed solid fuel composition as claimed in claim 1 wherein the coking agent is selected from a group consisting of:

starch, molasses, black liquor and sugar.

6. A clean burning processed solid fuel composition as claimed in claim 1 wherein the cellulosic material is selected from a group consisting of:
   vegetable fiber, straws, paper, dried leaves, sawdust, and peat.

7. A clean burning processed solid fuel composition as claimed in claim 1 including an odor enhancer in an amount of not more than 1% by weight of the total composition.

8. A clean burning processed solid fuel composition as claimed in claim 1 including a flame colorant in an amount of not more than 1% by weight of the total composition.

9. A clean burning processed solid fuel composition providing an improved flame output for use in the manufacture of fire-logs, fire starters and fuel pellets, consisting essentially of:
   at least 50% by weight of dried spent coffee grounds;
   at most 35% by weight of a combustible wax; and
   the balance selected from at least one of a combustible cellulosic material and a coking agent, the coking agent being at most 10% by weight of the total composition.

10. A clean burning processed solid fuel composition as claimed in claim 9 wherein the wax is a petroleum wax.

11. A clean burning processed solid fuel composition as claimed in claim 10 wherein the petroleum wax is paraffin.

12. A clean burning processed solid fuel composition as claimed in claim 9 wherein the coking agent is selected from a group consisting of:
   starch, molasses, black liquor and sugar.

13. A clean burning processed solid fuel composition as claimed in claim 9 wherein the cellulosic material is selected from a group consisting of:
   vegetable fiber, straws, paper, dried leaves, sawdust, and peat.

14. A clean burning processed solid fuel composition as claimed in claim 9 including an odor enhancer in an amount of not more than 1% by weight of the total composition.

15. A clean burning processed solid fuel composition as claimed in claim 9 including a flame colorant in an amount of not more than 1% by weight of the total composition.

16. A clean burning processed solid fuel composition having improved flame output for use in the manufacture of fire-logs, fire starters and fuel pellets, consisting essentially of:
   at least 50% by weight of dried spent coffee grounds;
   at most 35% by weight of a combustible wax; and
   the balance at least one combustible cellulosic material selected from a group consisting of:
      vegetable fiber, paper, dried leaves, sawdust, and peat.

17. A clean burning processed solid fuel composition as claimed in claim 16 including an odor enhancer in an amount of not more than 1% by weight of the total composition.

18. A clean burning processed solid fuel composition as claimed in claim 16 including a flame colorant in an amount of not more than 1% by weight of the total composition.

19. A clean burning processed solid fuel composition providing an improved flame output for use in the manufacture of fire-logs, fire starters and fuel pellets, consisting essentially of:
   at least 55% by weight of dried spent coffee grounds;
   at most 40% by weight of a combustible wax; and
   the balance a coking agent in an amount that is at most 10% by weight of the total composition.

20. A clean burning processed solid fuel composition as claimed in claim 19 wherein the wax is a petroleum wax.

21. A clean burning processed solid fuel composition as claimed in claim 20 wherein the petroleum wax is paraffin.

22. A clean burning processed solid fuel composition as claimed in claim 19 wherein the coking agent is selected from a group consisting of:
   starch, molasses, black liquor and sugar.

23. A clean burning processed solid fuel composition as claimed in claim 19 including an odor enhancer in an amount of not more than 1% by weight of the total composition.

24. A clean burning processed solid fuel composition as claimed in claim 19 including a flame colorant in an amount of not more than 1% by weight of the total composition.

* * * * *